Nov. 17, 1959 C. MINER, JR., ET AL 2,912,939
LOADING BRACE
Filed Jan. 6, 1955
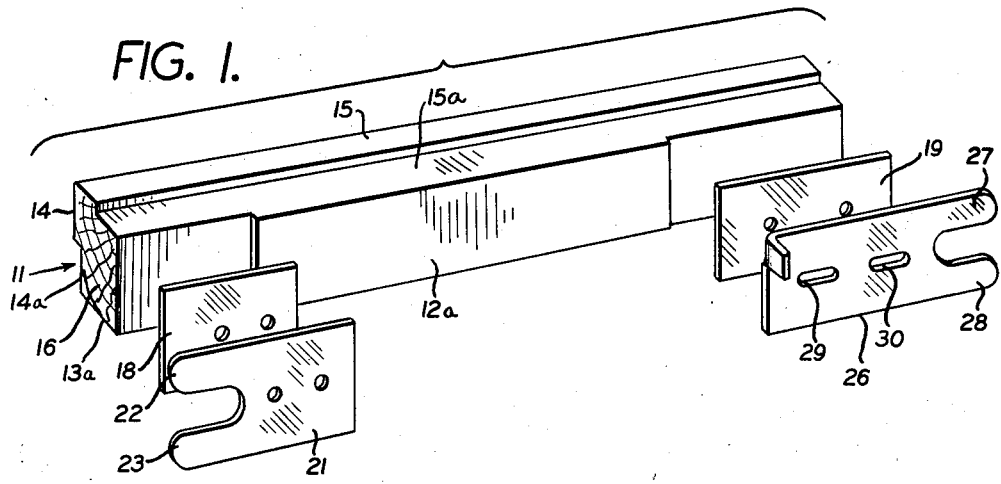
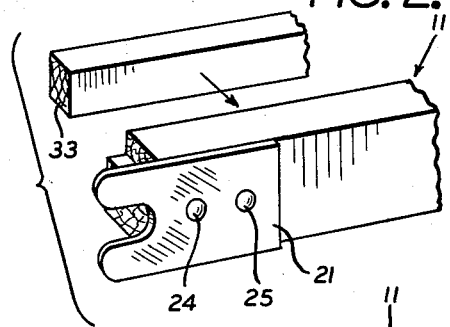
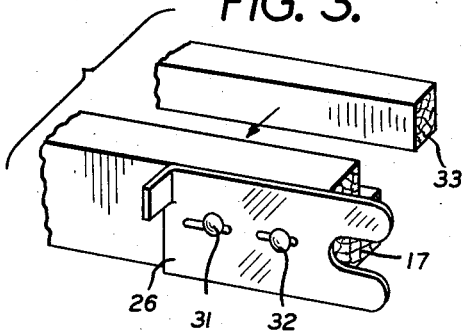
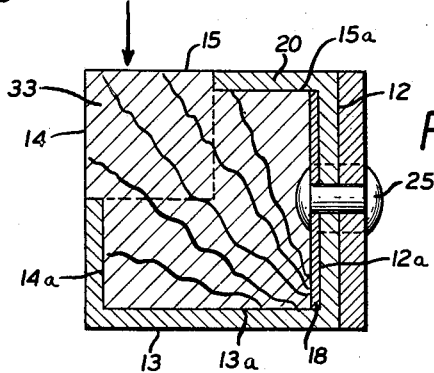
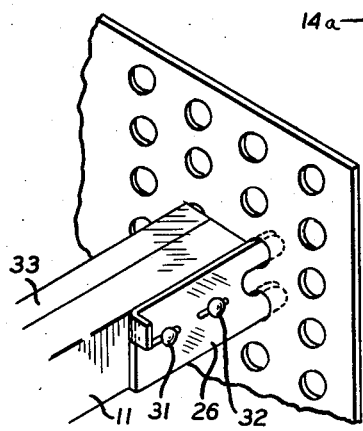
INVENTORS,
CHARLES MINER, JR.
ISAAC KINSEY
BY
Moses, Nolte, Crews & Berry
Attorneys.

United States Patent Office 2,912,939
Patented Nov. 17, 1959

2,912,939

LOADING BRACE

Charles Miner, Jr., Darien, Conn., and Isaac Kinsey, Larchmont, N.Y., assignors to Basic Structural Plastics, Inc., Larchmont, N.Y., a corporation of Delaware Application January 6, 1955, Serial No. 480,237

3 Claims. (Cl. 105—369)

The present invention relates to a dunnage bar utilized in keeping cargo secure when in transit, and more particularly, the present invention concerns a wooden loading brace having a reinforced plastic jacket.

Ordinarily, loading braces are made of wood, but since wood alone has comparatively narrow limits of stress and strain, added steel reinforcement is usually provided. This reinforcement is designed to strengthen the beam against structural breakdown.

While beams containing metal reinforcements achieve a fair degree of strength, they do so at the cost of added weight. This increase in deadweight, an important consideration in the field of transportation, naturally cancels much of the advantage gained in added beam strength.

The beam of the present invention is an improvement over ordinary wooden loading braces, for the weight of the beam has been kept to a minimum while the strength of the beam has not been sacrificed. Except for an exposed wood portion, a reinforced plastic jacket covers the beam serving to strengthen and protect it from ordinary wear and tear, as well as from more extraordinary abuse which may be anticipated considering the uses to which such a beam may be put. In addition, end plates on the beam contribute greater strength, protection and durability to the beam without adding excessive weight as in ordinary beams. Furthermore, the beam may be easily locked into the perforated metal lining of a freight car or other vehicle by means of forked attachments incorporated on the beam ends so as to form a bracing structure for any cargo on board.

This reinforced plastic jacket is more suitable than steel in so far as the former offers higher loading possibilities with much greater dimensional stability. On a straight concentrated loading test the steel reinforced beam took a permanent set of 1.42 inches at 4700 pounds. On the reinforced plastic beam of the present invention, the permanent set was only 0.22 inches at 4700 pounds. This indicates that in actual use there will be no permanent deformation of the plastic jacket, so that maintenance costs will be substantially reduced.

Standard steel reinforced beams usually weigh approximately 105 pounds each, while the reinforced plastic beams of the present invention may weigh only about 45 pounds. Substituting reinforced plastic for the steel in these beams will assure a weight saving of more than 100% per beam. This comparison is especially vivid when one considers that on occasion a hundred such beams may be employed in a railroad car.

An object of this invention is to provide a durable brace of long lasting usage for segregating and positioning lading that is shipped in railroad freight cars and other vehicles.

It is an object of this invention to provide a beam having a plastic jacket covering the extent of the beam, save an exposed wood portion situated on two adjacent beam faces.

It is an object of this invention to provide means for attaching the cargo to the exposed wood portion of the beam while the beam is secured to the vehicle.

It is a further object of this invention to provide a beam which offers a high degree of strength while maintaining a saving in weight over existing beams.

It is another object of this invention to provide for the replacement of the exposed wood portion of the beam after normal abuse to permit the beam to be utilized indefinitely.

It is another object of this invention to provide a beam which is economical to fabricate, and easy to use.

Other objects also will become apparent from the disclosure of this invention which follows, and the accompanying drawings, wherein:

Figure 1 is an exploded side perspective view of the beam showing the inclusion of end plates and forked members, and the provision for a plastic jacket;

Figure 2 is a partial perspective view of the left end of the beam showing the replaceable exposed wood section and the stationary forked member;

Figure 3 is a partial perspective view of the right end of the beam showing the replaceable exposed wood section and the slidable forked member;

Figure 4 is a transverse sectional view of the beam showing the arrangement of elements in relation to one another; and Figure 5 is partial perspective view of one end of the beam showing the manner in which the beam is connected with the perforated metal lining of a cargo vehicle.

This invention comprises a wooden beam 11 having four longitudinal faces 12, 13, 14 and 15 of equal dimensions, and having substantially square end faces 16 and 17. Stationary end plate 18 is located at one end of face 12a, and slidable end plate 19, longer than end plate 18, is located at the opposite end of face 12a. These protective end plates 18 and 19, composed of steel or other suitable material, are received within the respective ends of beam 11, so that they are flush with the surface of face 12a.

A fiber glass reinforced, suitable plastic material 20 peripherally surrounds approximately three-fourths of the face area of beam 11, including face 12a and end plates 18 and 19.

For preferred dimensions in this embodiment of the present invention, about one-quarter inch layer of surface wood is removed from lateral faces 12 and 13 of beam 11 exposing faces 12a and 13a. A similar layer half the width of beam 11 is removed from that strip portion of face 14 adjacent face 13 and from that strip portion of face 15 adjacent face 12, exposing faces 14a and 15a. Preferred plastic material 20 occupies the place of the removed surface wood layers, thus forming a protective jacket enclosing most of beam 11. The jacket is flush with and abuts the remaining exposed wood portions of faces 14 and 15, and secures in place thereunder in face 12a, end plates 18 and 19.

Forked member 21, having fingers 22 and 23 at one end thereof, is fixedly secured to end plate 18 by means of suitable double-headed bolts or rivets 24 and 25 passing through member 21 and plate 18. Similar forked member 26, having fingers 27 and 28 at one end thereof, and having slots 29 and 30 disposed therewithin, is slidably secured to end plate 19 by means of double-headed bolts or rivets 31 and 32. These bolts or rivets 31 and 32 are seated behind end plate 19, extend outwardly through slots 29 and 30, respectively, and terminate in external head portions of greater width than slots 29 and 30 so as to prevent member 26 from being completely removed.

Accordingly, slots 29 and 30 in arrangement with bolts 31 and 32 define the displaceable limits of forked member 26 along the longitudinal axis of end plate 19. In this way, beam 11 may be positioned by slidably extending forked member 26 into one perforated lining of a freight car or similar vehicle after forked member 21 has been inserted into an opposite perforated lining.

It is preferred that end plates 18 and 19, bolts or rivets 24, 25, 31 and 32, as well as forked members 21 and 26 be constructed from suitable metal material. This is desired as metal end plates may more readily absorb the sheering action created at the points of attachment of forked members 21 and 26 with beam 11 by the stresses which occur when cargo bears against the beam positioned in a freight car by means of the forked members.

The exposed wooden beam surface is situated on the remaining adjacent strip portions of faces 14 and 15. These combined strip portions serve as a base section 33 into which nails may be driven for the purpose of securing the cargo to beam 11. With ordinary use, this exposed wooden portion 33 becomes perforated with nail holes, damaged and in need of repair from time to time. When this occurs, a square strip taken along the longitudinal base section 33 is removed from beam 11. A new square strip is inserted in its place so as to form a new base section 33 integrally engaged with the remainder of beam 11, thereby affording continued service of the beam.

The additions of steel end plates and reinforced plastic to the beam offer greater protection against excessive stresses and strains than wood alone. Moreover, the provision for replacing worn and perforated base sections, extends the life of such a beam indefinitely.

Concerning the outer dimensions of beam 11, it is preferred that beam 11 remain square with one quarter inch radius rounded edges. It is also preferred that fiberglass reinforced plastic be used as the protective and structural covering, although other reinforcement materials may be substituted for the fiberglass without departing from the essence of this invention.

We have described what we believe to be the best embodiments of our invention. We do not wish, however, to be confined to the embodiments shown, but what we desire to cover by Letters Patent is set forth in the appended claims.

We claim:

1. In a brace having a wooden core, a face on said core having a cut-out portion at one end defining a recess whose surface lies within the regular surface of said core, a metallic plate lying on the surface of said recess, a fiber glass reinforced plastic jacket surrounding said core and overlying said plate, a securing member, and means passing through said fiber glass reinforced jacket for attaching said securing member to said plate to maintain said member and plate in parallel relation.

2. In a brace having a wooden core, a face on said core having a cut-out portion at one end defining a recess whose surface lies within the regular surface of said core, a metallic plate lying on the surface of said recess and having its outer face substantially flush with the regular surface of said core, a fiber glass reinforced plastic jacket surrounding said core and overlying said plate and serving to retain the latter in said recess, a securing member, and means protruding from the side of said plate and passing through said fiber glass reinforced jacket for engaging and attaching said securing member to said plate to maintain said member and plate in parallel relation.

3. In a brace having a wooden core, a face on said core having a cut-out portion at one end defining a recess whose surface lies within the regular surface of said core, a metallic plate lying on the surface of said recess and having its outer face substantially flush with the regular surface of said core, a fiber glass reinforced plastic jacket surrounding said core and overlying said plate and serving to maintain the latter in said recess, a securing member having slots, and means protruding from the side of said plate and passing through said fiber glass reinforced jacket and through said slots for slidably engaging said securing member and maintaining it attached to said plate in parallel relation thereto.

References Cited in the file of this patent

UNITED STATES PATENTS

| | | |
|---|---|---|
| 2,294,795 | Moses | Sept. 1, 1942 |
| 2,309,606 | Nystrom | Jan. 26, 1943 |
| 2,417,586 | Crosby | Mar. 18, 1947 |
| 2,570,958 | Lee | Oct. 9, 1951 |
| 2,593,174 | O'Dell | Apr. 15, 1952 |
| 2,627,821 | Sjogren | Feb. 10, 1953 |
| 2,753,603 | Strawther | July 10, 1956 |
| 2,756,524 | Klenisorge | July 31, 1956 |

OTHER REFERENCES

Fiberglass Reinforced Plastics (Reinhold Publishing Corporation), by Sonneborn, 1954, 1st ed., pp. 1, 2, and 162.